United States Patent
Hegazy

(10) Patent No.: US 11,272,323 B1
(45) Date of Patent: Mar. 8, 2022

(54) LOCATION-BASED SECURED COMMUNICATION SYSTEM AND METHOD OF USE

(71) Applicant: Mohamed Eslam Hegazy, Abu Dhabi (AE)

(72) Inventor: Mohamed Eslam Hegazy, Abu Dhabi (AE)

( * ) Notice: Subject to any disclaimer, the term of this patent is extended or adjusted under 35 U.S.C. 154(b) by 0 days.

(21) Appl. No.: 17/102,185

(22) Filed: Nov. 23, 2020

(51) Int. Cl.
*H04W 4/029* (2018.01)

(52) U.S. Cl.
CPC .................... *H04W 4/029* (2018.02)

(58) Field of Classification Search
CPC ..................................... H04W 4/029
USPC ........................................ 455/456.3
See application file for complete search history.

(56) References Cited

U.S. PATENT DOCUMENTS

| | | | |
|---|---|---|---|
| 2004/0128324 A1* | 7/2004 | Sheynman | G06F 21/10 |
| 2011/0008017 A1* | 1/2011 | Gausereide | G11B 27/036 |
| | | | 386/280 |

* cited by examiner

Primary Examiner — Ted M Wang
(74) Attorney, Agent, or Firm — Leavitt Eldredge Law Firm

(57) ABSTRACT

A location-based communication system and method of use are described for customizing and controlling media sharing between users, thereby providing for personalized location-based communication. The system allows a first user to create content associated with a location and sends said content to a server via a computing device. The first user may set viewing requirements (e.g., public access, private access) associated with the content for future access. When a subsequent user arrives at the location at a subsequent time, the subsequent user may view content created by the first user after viewing an advertisement associated with content. The subsequent user may create content associated with the location and send said content to the server via a computing device.

3 Claims, 5 Drawing Sheets

LOCATION-BASED SECURED COMMUNICATION SYSTEM AND METHOD OF USE

BACKGROUND

1. Field of the Invention

The present invention relates generally to communication systems, and more specifically to a location-based communication system that enables a user to customize the distribution of media sharing.

2. Description of Related Art

Advancements in location-based communication systems have drastically increased over the last decade. For example, computer systems and networks have permitted users to share media content with other users online. At the same time, computer systems and networks provide an efficient and cost-effective medium for service providers to provide customized advertisement services. Rather than charge users directly as a form of revenue, many service providers require users to view an advertisement (could be in form of audio, a picture, video, etc.) instead.

Commonly in the art, many users share media (e.g., text messages, voice messages, photographs, videos, or the like) with other users that they already know in a short-message-service (SMS), email, or social media communication. Users receiving shared media typically want to view and interact with media created by other users that have common interests. However, due to the vast amount of media present online, it may be difficult for users to effectively locate or identify other users having common interests. Furthermore, it may be difficult for users to customize and control the media sharing with other users based on a timeframe or on a specific future date.

Hence, it would be advantageous to have a system and method that allows a user to effectively customize the distribution of media sharing with other users having common interests.

Accordingly, although great strides have been made in the area of location-based communication systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
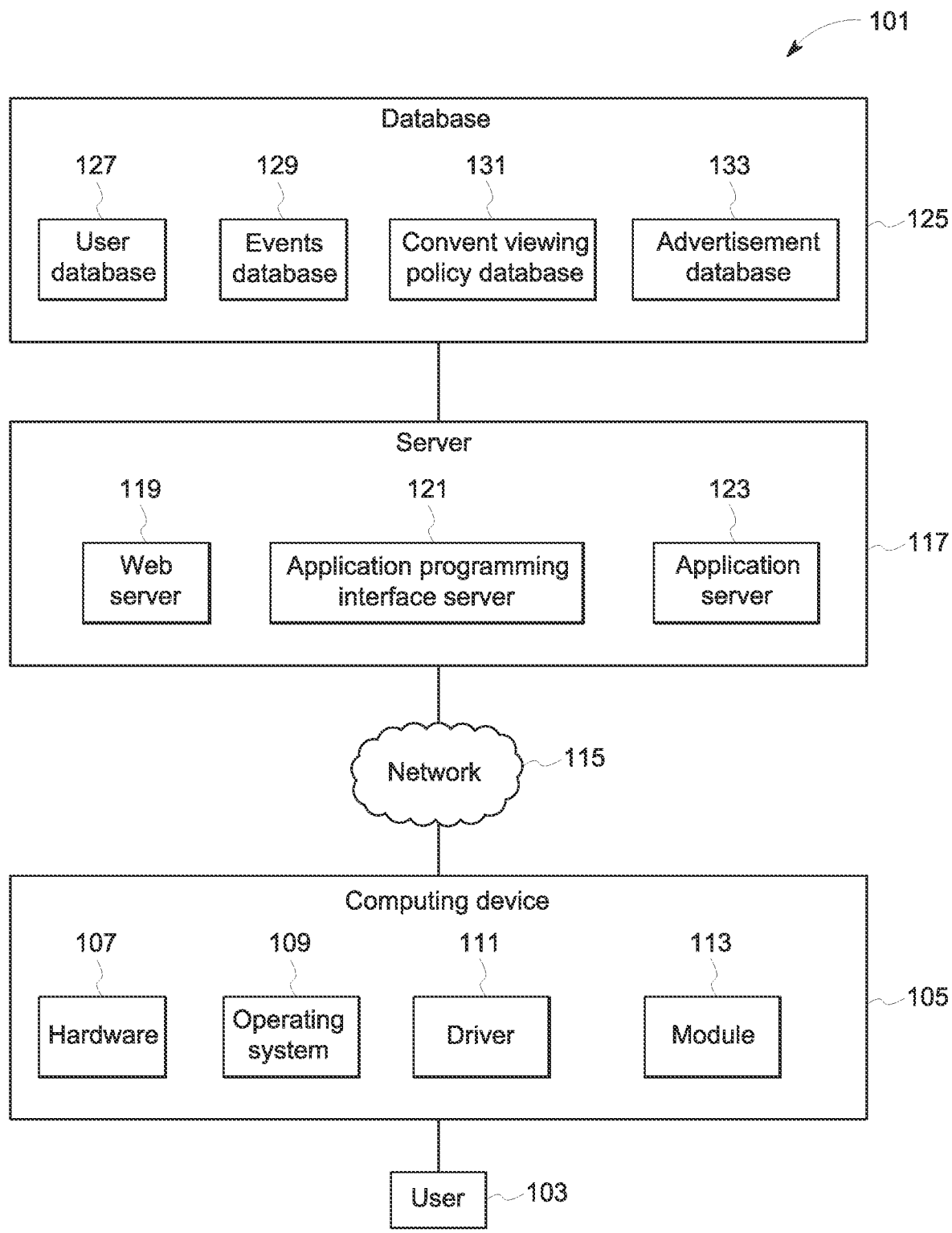
FIG. 1 is a schematic of a location-based communication system according to one or more embodiments of the present invention.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional media sharing systems. Specifically, the system of the present invention allows users to customize the distribution of media sharing, thereby providing for improved location-based communication. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Devices, systems and methods are provided for electronic communication and social networking. In various particular embodiments, the devices, systems or methods can involve one or more devices in communication over a network. Such devices, systems, and methods can facilitate location-based communication across time.

In some embodiments, a first user may visit a location and may be interested in communicating with future visitors of the location. The location may be a place where the first user plans to propose to his or her significant other, or other special event in a venue. For example, the first user may want to document this special moment by video or image capturing and share it privately with his or her friends and family members at a future time. In another example, the first user may want to preserve and share his or her memories of his or her vacation at a resort through voice notes, videos, pictures, or the like.

In various embodiments, a first user creates content (e.g., a voice note, a photograph, an image, a video, or other media content) at a location using a first mobile device. The content is associated with an account which allows the first user to grant selective visitors (e.g., friends and family) future access to the content and to store and save the content for a specified amount of time. In addition, the content may be associated with a location (e.g., where the content is created) and a time (e.g., a created time, a stored time, etc.). Moreover, the first user may provide the content to a service provider server for storage and access by future visitors of the same or nearby location. The first user may customize which future visitors may access the content (e.g., friends, family, or public).

The location associated with the content may be based on a user location determined by the first mobile device. The first mobile device may use global positioning system (GPS), cellular signals, Wi-Fi signals, BLUETOOTH® Low Energy (BLUETOOTH® LE) signals, near field communication (NFC) signals, long-term evolution (LTE) signals, or a combination thereof. The first mobile device may associate the user location to the content by geotagging the content, which adds geographical information as metadata to the content. The geographical identification may include latitude and longitude coordinates, altitude, distance, accuracy data, and/or place names.

The geographical identification of the content may range from broad to specific. For example, the location may include an attraction venue, a section within the venue, a row within a section, or a seat within a section. In another example, the location may include a building, a floor within a building, or a room within a floor. However, this is merely illustrative. The location may be any location at which the user of the first mobile device wishes to geotag content for a future visitor to that location. The location associated with the content may be identified using one or more levels of specificity.

The privacy associated with the content may be based on relationship or validity time. The content owner may choose to keep the content public, or it can be viewed by his or her contacts and his or her descendant whom have not born yet. For example, the content owner may allow the content to be viewed for a number of family generations or be kept online for a specific period of time. When the owner's descendant creates his or her own account and identifies his or her relationship with the content owner to the system, the descendant may then view the content in accordance with the content owner's previously defined by the content privacy policy and expiry date.

The time associated with the content may be based on timestamping by the first mobile device. The first mobile device may associate a time with the content by timestamping the content, which adds a timestamp as metadata to the content. The timestamps of the content may include, but without limitation, a created time, an accessed time, a modified time, a saved time, an uploaded time, a downloaded time, and the like.

In various embodiments, when a second user is subsequently at or close to a location associated with content that has been geotagged at that location, the second user uses a second mobile device to access and receive the content from the service provider server. The service provider server receives a location of the second user based on a user location determined by the second mobile device. The service provider server provides access to the content based on the location of the second user and/or privacy criteria. For example, the service provider server may determine, based on the received location of the second user and one or more locations associated with stored content that the second user is at or near the location of a first portion of the content. Based on the determination that the second user is at or near the location of the first portion of the stored content, and based on the content privacy policy and expiry date, the second user may be provided access to that first stored content. The second user may then view the first stored content on the second mobile device.

In some embodiments, content shared (or not shared) with the second user may be based on information about the first user and the second user, such as shared interests related to or independent of the event. For example, the first and second user may both be interested in travelling and exploring new places. As such content from the first user may be shared with the second user if all criteria are met (i.e., location, privacy, expiry date). In another example, the first user may enjoy indoor activities while the second user prefers outdoor activities. If the content associated with the first user is associated with an indoor activity the second user has no interest in, content may not be shared. This enables the system to provide selective content so that the second user is only presented with content of interest to the second user.

The second user may view the content of the first user and may respond by adding a comment and/or any other content. The second user's response may automatically be associated with the same "content viewing criteria" that the content of the first user has. In an embodiment, when a future user is subsequently at or nearby the location associated with the content of the first user and the response of the second user, the future user may view both the content and the response and may respond by adding a comment and/or any other content. In another embodiment, the response may be communicated directly (e.g., delivered in real-time from device to device or through a server or network) to any of the participating users (if their account is still active) whom will receive a notification of the response and/or is able to view the response. In this way, a connection between the first user and the second user may be established by which the first user and second user may be able to continue communications if desired.

In other embodiments, the system may include public content. For example, one or more news reporters employed by a news channel may attend a public event (e.g., a spaceship launch to planet Jupiter). The news reporter or other news channel employee may upload the historical content to the service provider servers and assign the content to the event location. The news reporter may also select the "content viewing criteria" to be public. In another example, a user may share content relating to a freedom of speech protest taking place. The user may choose to upload the historical content and assign the content to the event location. In addition, the user may select the "content viewing policy" to be public. By the time the protests are over, all the shared content will be part of the same library which can be viewed by future visitors for the same location, where they can view the content while standing in the same spot that the protest was taking place.

While the various examples disclosed herein focus on particular aspects regarding the historical content saving and viewing based on a location, it will be understood that the various inventive principles and embodiments disclosed herein can be applied to other types of social media applications and arrangements as well. For example, communications that is performed on a closed or proprietary computing system may utilize one or more of the aspects and features found in the various systems and methods provided.

In another embodiment, a host server company may use the system to collect revenue from advertisers who pay the user to put their advertisements in the content. The host server company may require advertisers to pay a premium to allow the advertisers to associate their advertisements with a sponsored event. For example, sponsors for the spaceship launch to planet Jupiter event example mentioned above include drink company A, sportswear company B, software company C and cars company D. Drink company A and software company C may choose to pay host server company an agreed amount of money in order to keep their respective advertisements associated with the event for 15 years. In the case of any visiting user to the location, if a visiting user chooses to look into the application and retrieve some of the contents related to the spaceship launch, the visiting user may view the advertisements of those drink company A and software company C without payment to the host server company. In the case of the agreed sponsored period is terminated or if no company chooses to sponsor the event through playback, the host server company may provide other advertisements to visiting users based on the users' interests. In the case of a private event (e.g., family gathering) or any other event without a specified sponsor, the host server company may provide other advertisements to visiting users based on the users' interests.

Reference throughout the specification to "various embodiments," "some embodiments," "one embodiment," "an embodiment," "various examples," "one example." "an example, or "some examples' means that a particular feature, structure, or characteristic described in connection with the embodiment or example is included in at least one embodiment. Thus, appearances of these are not necessarily all referring to the same embodiment. Furthermore, the particular features, structures or characteristics may be combined in any suitable manner in one or more embodiments.

According to an embodiment, a computer program product can comprise a non-transitory machine readable medium. The non-transitory machine readable medium can have computer readable and executable code for instructing one or more processors to perform any of the methods disclosed herein.

Referring now to the drawings wherein like reference characters identify corresponding or similar elements throughout the several views, FIG. 1 depicts a diagram illustrating components of an exemplary system 101 for implementing one or more embodiments of the present invention. It will be appreciated that system 101 overcomes one or more of the above-listed problems commonly associated with conventional location-based communication systems. By way of example, system 101 may be implemented to provide location-based social media viewing across time.

In the contemplated embodiment, system 101 includes one or more users 103, one or more computing devices 105, one or more networks 115, one or more servers 117, and one or more databases 125. The user 103 includes one or more persons, one or more businesses, or a combination thereof interacting with system 101. Examples of businesses include, but are not limited to, corporations, partnerships, limited liability companies, financial institutions, and other business entities.

The computing device 105 includes one or more hardware components 107, one or more operating systems 109, and one or more modules 111. The operating system 109 communicates with the hardware 107 through one or more drivers 111. Examples of the operating system 109 may include, without limitation, WINDOWS® OS, MICROSOFT® OS, iOS, ANDROID® OS, SYMBIAN™ OS, and others. Examples of modules 113 include, without limitation, a camera module, a BLUETOOTH® communication module, a speaker module, a microphone module, and a network interface module.

Examples of network 115 include, but are not limited to, wireless network, wire line network, public network such as the Internet, Intranet, private network, General Packet Radio Network (GPRS), Local Area Network (LAN), Wide Area Network (WAN), Metropolitan Area Network (MAN), cellular network, Public Switched Telephone Network (PSTN), personal area network, and the like. Network 115 may be operable with cellular networks, Bluetooth® network, Wi-Fi networks, or any other networks or combination thereof. Further, the network 115 may include network devices, such as network switches, hubs, routers, host bus adapters (HBAs), for providing a communication link between system 101 and other connected devices and/or systems.

The server 117 can be employed at a designated service provider and can provide suitable interfaces that enable communication using various modes of communication and/ or via the network 115. The server 117 may include, without limitation, a web server 119, an application programming interface (API) server 121, and an application server 123. Web server 119 may be configured as a communication means between web users and/or applications such as a web browser, web browser toolbar, desktop widget, mobile widget, web-based application, web-based interpreter, and so forth. API servers 121 may be arranged to communicate with various user programs on different operating systems or third-party applications. Application servers 123 may be configured to employ multiple services and/or divided into multiple servers where each server runs a single service or multiple services. Those services may include, but without limitation, an account service, content management service, notification service, delivery service, advertisement management service, and payment service.

Application servers 123 may also be arranged to link and communicate with the one or more databases 125, including, without limitation, user database 127, events database 129, content viewing policy database 131, and advertisement database 133. Databases 125 may store and manage various types of information for use by application servers 117 and may comprise or be implemented by various types of computer storage devices (e.g., servers, memory) and/or database structures (e.g., relational, object-oriented, hierarchical, dimensional, network) in accordance with the described embodiments.

Figure 2:
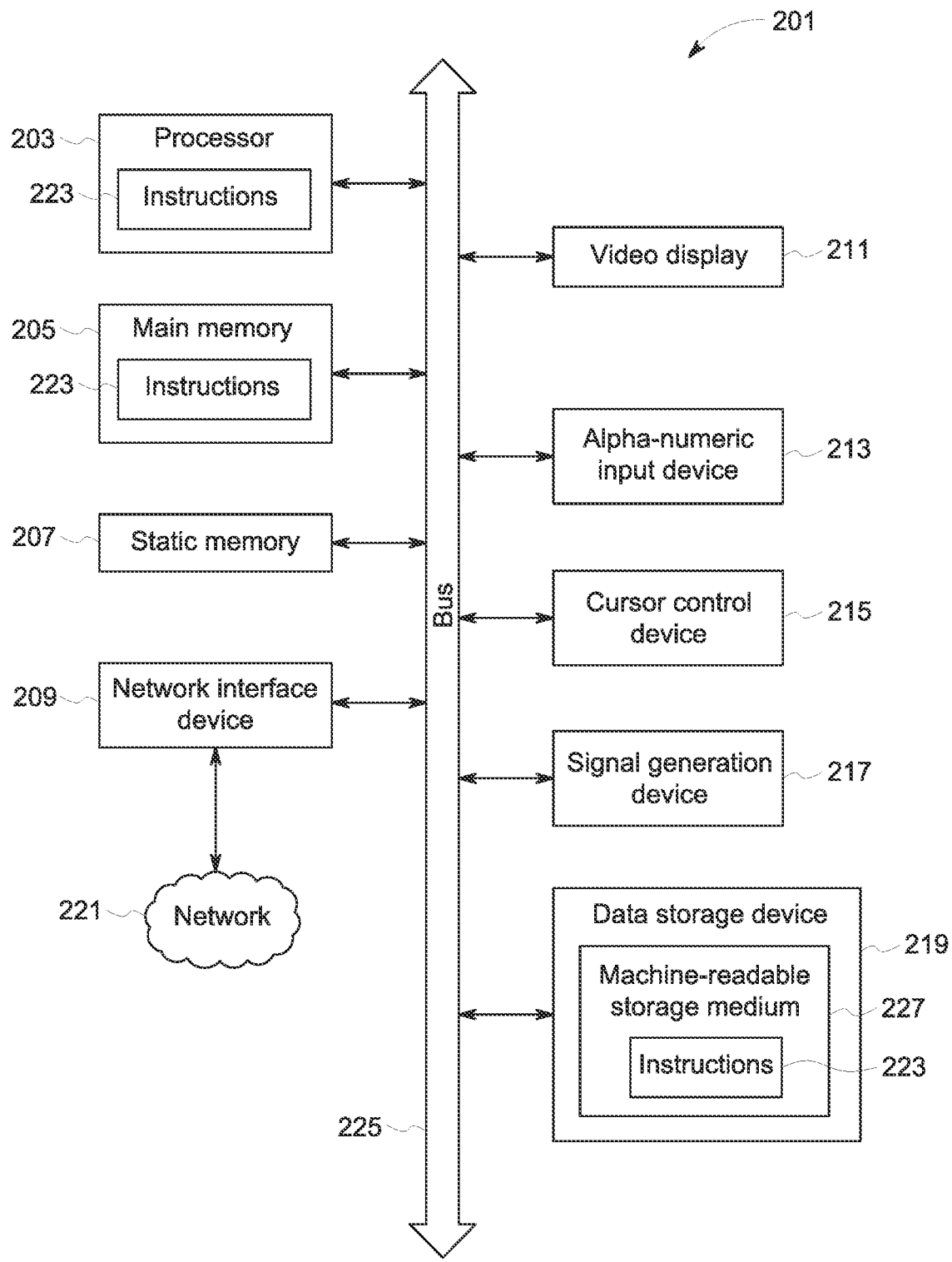
FIG. 2 is a block diagram of an example computer system within which instructions for causing a machine to perform any one or more of the methodologies discussed herein may be executed.

In FIG. 2, a block diagram of a machine in the example form of a computer system 201 within which a set of instructions for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The computer system 201 may be implemented as any of a variety of conventional computing devices, including, for example, servers, a desktop PC, a notebook or portable computer, a workstation, a mainframe computer, an entertainment device, cellular phones, smart phones, PDAs, portable computers, desktop computers, a field-programmable gate array device, a microcontroller, tablet computers, phablets, an internet appliance, a transceiver, a printing machine (also referred as a printer, or a printing device), a scanning machine, a photocopier machine (also referred as a photocopy machine), communication receivers, data encryption drives, and the like. Further, while only a single machine is illustrated, the term "machine" shall also be taken to include any collection of machines that individually or jointly execute a set (or multiple sets) of instructions to perform any one or more of the methodologies discussed herein.

The computer system 201 includes at least one processor 203 having one or more sets of instructions 223, a main memory 205 (e.g., read-only memory (ROM), flash memory, dynamic random access memory (DRAM), synchronous DRAM (SDRAM)) having one or more sets of instructions 223, a static memory 207 (e.g., flash memory, static random access memory (SRAM)), a network interface device 209, and a data storage device 219 which communicate with each other via a bus 225.

The computer system 201 may also include a video display 211 (e.g., a liquid crystal display (LCD) or a cathode ray tube (CRT)), an alpha-numeric input device 213 (e.g., a keyboard), a cursor control device 215 (e.g., a mouse, keypad, etc.), and a signal generation device 217 (e.g., a speaker, microphone, etc.). In one embodiment, the video display 211, the alpha-numeric input device 213, and the cursor control device 215 may be combined into a single component or device (e.g., an LCD touch screen).

Instructions 223 may reside, completely or at least partially, within the processor 203, main memory 205, or a combination thereof during execution thereof by system 201, the processor 203 and main memory 205 also constituting machine-readable media (a.k.a. computer-readable media). Instructions 223 may include directions for storing instructions, performing one or more functions, and the like. For example, instructions 223 may include detecting one or more files to perform one or more methodologies described herein. Instructions 223 may further be transmitted or received over the network 221 using a transmission medium, for instance network interface device 209, and any one of a number of well-known transfer protocols (e.g., HTTP, HTTPS, FTP, TCP, and the like).

The network interface device 209 facilitates communication with other computing systems (not shown) via one or more networks 221. Other computing systems, for example, may include conventional computing devices as described above, internet connected devices/systems, or an external storage such as a server, or a cloud computing system.

The data storage device 219 may include machine-readable storage medium 227 (a.k.a. computer-readable storage medium) on which is stored one or more sets of instructions 223. Machine-readable storage medium 227 may also include any medium that is capable of storing, encoding or carrying a set of instructions for execution by the machine and that cause the machine to perform any one or more of the methodologies of the present application. Examples of machine-readable storage medium 227 include, but without limitation, solid-state memories (e.g., hard disks, compact disks, digital versatile disc, digital video disc (DVDs), and the like), optical media (e.g., optical disks) and magnetic media (e.g., magnetic tapes).

It is also contemplated and will be appreciated that network 221 may be a wireless network, a wired network, or a combination thereof. Network 221 may also be an individual network or a collection of many such individual networks, interconnected with each other and functioning as a single large network, e.g., the Internet or an intranet. Network 221 may be implemented as one of the different types of networks, such as intranet, local area network (LAN), wide area network (WAN), the internet, near field communication (NFC), and such. Additionally, network 221 may either be a dedicated network or a shared network, which represents an association of the different types of networks that use a variety of protocols. Furthermore, network 221 may include network devices, such as network switches, hubs, routers, host bus adapters (HBAs), for providing a communication link between computer system 201 and other connected devices and/or systems.

Figure 3:
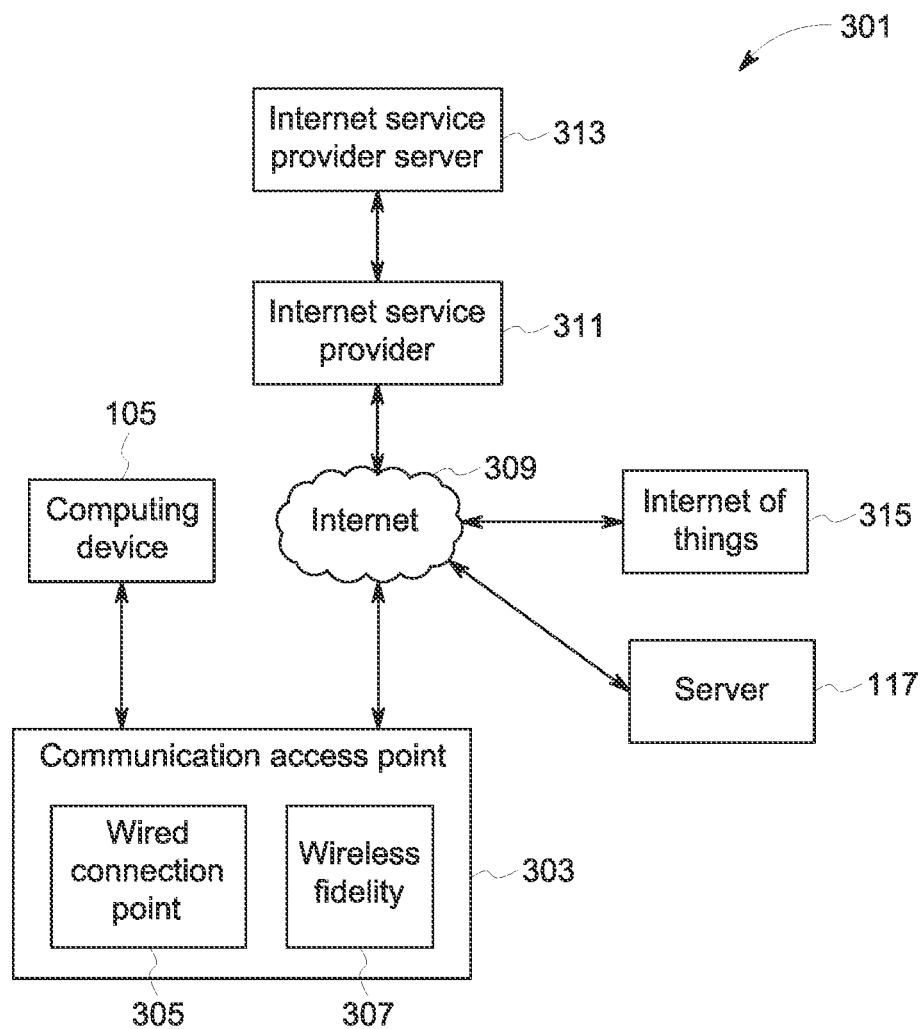
FIG. 3 is a diagram of an illustrative system for the location-based communication system of FIG. 1 in accordance with one or more embodiments of the present application.

In FIG. 3, with reference to FIG. 1, a diagram of an illustrative system 301 for the location-based communication system 101 is depicted. As shown, the computing device 105 can connect to the internet 309 through one or more communication access points 303. The communication access point 303 includes wired connection points 305 (e.g., network cable) and wireless fidelity 307 (also known as WIFI). Examples of wireless fidelity 307 include, without limitation, BLUETOOTH®, General Packet Radio Service (GPRS), 4G modem, 5G modem, LTE, and any newer modem of any generation.

The internet 309 may be connected to an internet service provider (ISP) 311. The ISP 311 may include content filtering based on any applicable rules and regulations implemented in the jurisdiction in which the user 103 employs the computing device 105. In addition, the ISP 311 may provide services to the user 103 using an Internet Service Provider Server (ISP Servers) 313. Examples of ISP Servers 313 include, without limitation, email, data storage, or any other internet services. Further, the ISP 311 can transmit any communication requests not provided by the ISP 311 to the internet 309 or to the internet of things 315.

Figure 4:
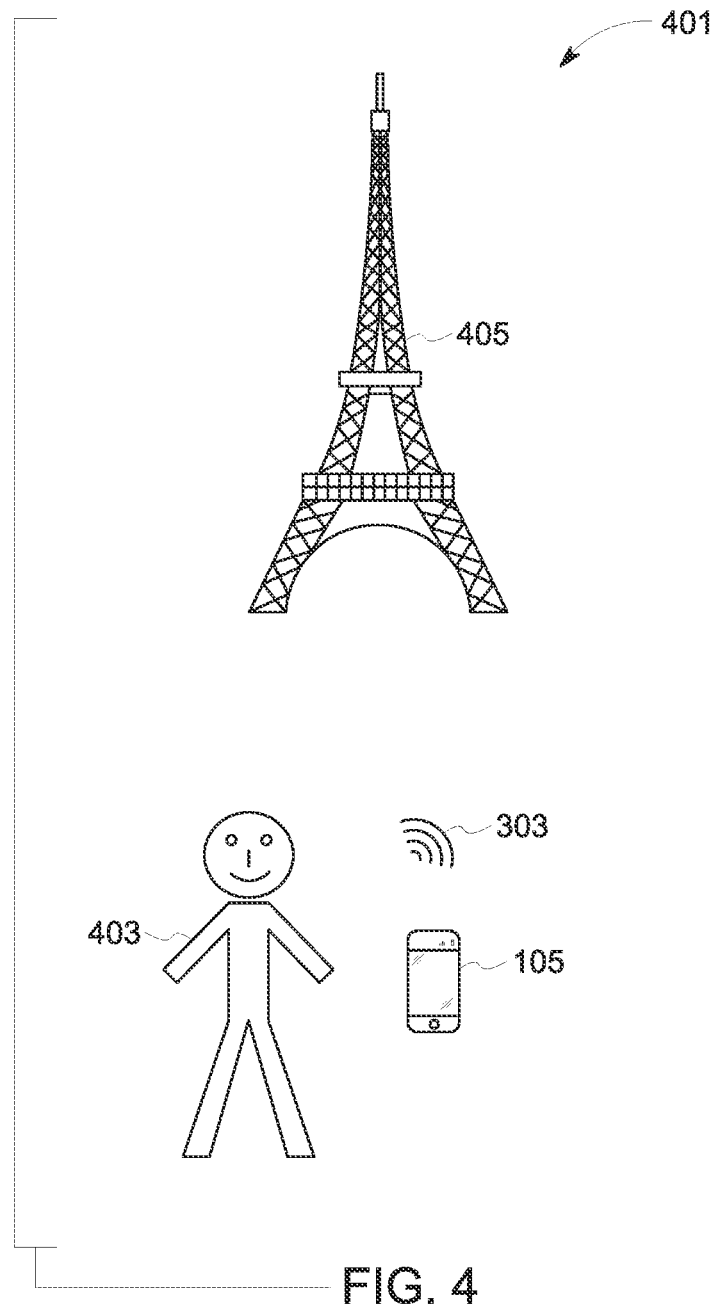
FIG. 4 is a diagram of an illustrative event of interest showing a user location and various other locations in the event of interest according to an embodiment of the present application.

In FIG. 4, with reference to FIGS. 1 and 3, a diagram of an illustrative event of interest 401 showing a user location and various other locations in the event of interest is depicted. As shown, the location 405 of the event of interest 401 can be any location including, without limitation, a public attraction area, a famous building, a famous location, a private home, an apartment, a workplace, or the like. A visitor 403 may use the computing device 105 to connect to the internet 309 and server 117 via communication access points 303.

Figure 5:
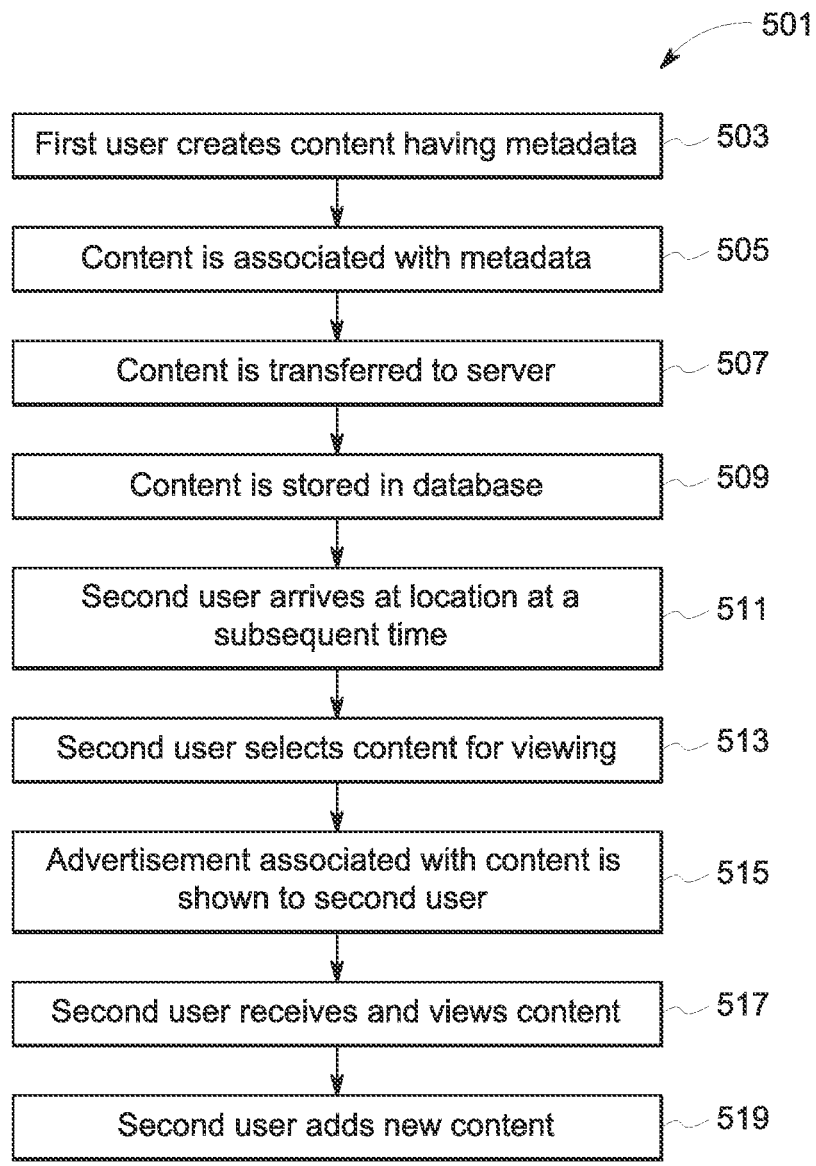
FIG. 5 is a flowchart depicting an illustrative method of the location-based communication system of FIG. 1 in accordance with one or more embodiments of the present application.

FIG. 5 is a flowchart depicting an illustrative method of the location-based communication system of FIG. 1 in accordance with one or more embodiments of the present application. During use, a first user creates content which is associated with metadata, as shown with boxes 503, 505. Content may include, without limitation, video, audio note, picture, or text. Metadata may include, without limitation, location, date, and previously defined preferences (i.e., content previewing policy) set by the first user for subsequent users to view the content. Content is transferred to a server (e.g., web application, application programming interface, etc.) via network and then to an application server, as shown with box 507. The application server applies any previously defined preferences and/or allows the first user to configure new defined preferences. Content is then stored within a database, as shown with box 509. When a second user arrives at location at a subsequent time, the second user may select content for viewing, as shown with boxes 511, 513. Content available for viewing is contingent on the defined preferences set by the first user. Advertisement associated with the content is shown to the second user prior to receiving and viewing content, as shown with boxes 515, 517. The second user may then choose to add new content that can be viewed by any subsequent user who falls under the previously defined preferences, as shown with box 519.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A system, comprising:
a computer system, the computer system having:
one or more communication interfaces, the interfaces including an input device and a display device;
one or more communication components receiving data and information via one or more networks;
one or more processors for executing computer-executable instructions; and
one or more memories for storing computer-executable instructions that when executed by the one or more processors cause the computer system to perform steps comprising:
receiving content associated with a location from a first user device of a first user, the content including metadata;
allowing the first user to define one or more criteria of the content, the one or more criteria of the content including time restrictions for viewing the content and availability restrictions for subsequent users viewing the content, wherein the time restrictions include a specific amount of time and an infinite amount of time, wherein the availability restrictions include public users, private users, and non-human entity users;
receiving a request to view content from a second user device of a second user while the second user device is in the location;
sending an advertisement associated with the content to the second user device, the advertisement including time restrictions and availability restrictions set by the advertisement creator, wherein the time restrictions include a specific amount of time and an infinite amount of time, wherein the availability restrictions include public users, private users, and non-human entity users;
providing access to the content to the second user via the second user device; and
receiving new content associated with the location from the second user device of the second user, the content including metadata.

2. A non-transitory computer-readable medium storing instructions thereon that, when executed, by one or more processors, cause a computer system to:
receiving content associated with a location from a first user device of a first user, the content including metadata;
allowing the first user to define one or more criteria of the content, the one or more criteria of the content including time restrictions for viewing the content and availability restrictions for subsequent users viewing the content, wherein the time restrictions include a specific amount of time and an infinite amount of time, wherein the availability restrictions include public users, private users, and non-human entity users;
receiving a request to view content from a second user device of a second user while the second user device is in the location;
sending an advertisement associated with the content to the second user device, the advertisement including time restrictions and availability restrictions set by the advertisement creator, wherein the time restrictions include a specific amount of time and an infinite amount of time, wherein the availability restrictions include public users, private users, and non-human entity users;
providing access to the content to the second user via the second user device; and
receiving new content associated with the location from the second user device of the second user, the content including metadata.

3. A computer-implemented method for customizing the sharing of media content, the method comprising:
providing an apparatus for a computing device to communicate with a server via one or more networks;
displaying a user interface on the computing device, the user interface configured to receive computer executable-instructions from the user, the computer executable-instructions being implemented via one or more processors;
wherein the computer executable-instructions causes the one or more processors to perform operations via one or more networks comprising:
receiving content associated with a location from a first user device of a first user, the content including metadata;
allowing the first user to define one or more criteria of the content, the one or more criteria of the content including time restrictions for viewing the content and availability restrictions for subsequent users viewing the content, wherein the time restrictions include a specific amount of time and an infinite amount of time, wherein the availability restrictions include public users, private users, and non-human entity users;
receiving a request to view content from a second user device of a second user while the second user device is in the location;
sending an advertisement associated with the content to the second user device, the advertisement including time restrictions and availability restrictions set by the advertisement creator, wherein the time restrictions include a specific amount of time and an infinite amount of time, wherein the availability restrictions include public users, private users, and non-human entity users;

providing access to the content to the second user via the second user device; and receiving new content associated with the location from the second user device of the second user, the content including metadata.

\* \* \* \* \*